United States Patent
Krishnasamy et al.

(10) Patent No.: US 10,831,369 B2
(45) Date of Patent: *Nov. 10, 2020

(54) SYSTEM AND METHOD FOR SYNCHRONIZING CACHES AFTER REBOOT

(71) Applicant: NETAPP, INC., Sunnyvale, CA (US)

(72) Inventors: Somasundaram Krishnasamy, Austin, TX (US); Brian McKean, Boulder, CO (US); Yanling Qi, Austin, KS (US)

(73) Assignee: NETAPP, INC., Sunnyvale, CA (US)

( * ) Notice: Subject to any disclaimer, the term of this patent is extended or adjusted under 35 U.S.C. 154(b) by 20 days.

This patent is subject to a terminal disclaimer.

(21) Appl. No.: 15/821,119

(22) Filed: Nov. 22, 2017

(65) Prior Publication Data

US 2018/0129421 A1 May 10, 2018

Related U.S. Application Data

(63) Continuation of application No. 14/599,353, filed on Jan. 16, 2015, now Pat. No. 9,830,081.

(51) Int. Cl.
*G06F 3/06* (2006.01)
*G06F 12/0866* (2016.01)

(52) U.S. Cl.
CPC ............ *G06F 3/0607* (2013.01); *G06F 3/061* (2013.01); *G06F 3/067* (2013.01); *G06F 3/0655* (2013.01); *G06F 12/0866* (2013.01); *G06F 2212/2146* (2013.01)

(58) Field of Classification Search
CPC ......... G06F 12/0866; G06F 2212/2146; G06F 3/0607; G06F 3/061; G06F 3/0655; G06F 3/067; G06F 12/0868; G06F 2212/1016
See application file for complete search history.

(56) References Cited

U.S. PATENT DOCUMENTS

| | | | |
|---|---|---|---|
| 8,180,967 B2 | 5/2012 | Rajwar et al. | |
| 9,471,510 B2 | 10/2016 | Susarla et al. | |
| 9,830,081 B2 * | 11/2017 | Krishnasamy | ........ G06F 3/0607 |
| 2005/0155021 A1 | 7/2005 | DeWitt | |
| 2007/0050548 A1 * | 3/2007 | Bali | ..................... G06F 12/0804 711/118 |
| 2010/0070701 A1 * | 3/2010 | Iyigun | ................. G06F 11/1441 711/113 |
| 2014/0006357 A1 * | 1/2014 | Davis | .................. G06F 11/1464 707/667 |
| 2014/0279941 A1 * | 9/2014 | Atkisson | ............. G06F 16/2365 707/690 |

* cited by examiner

*Primary Examiner* — Zhuo H Li
(74) *Attorney, Agent, or Firm* — Haynes and Boone, LLP

(57) ABSTRACT

A method and system for synchronizing caches after reboot are described. In a cached environment, a host server stores a cache counter associated with the cache, which can be stored in the cache itself or in another permanent storage device. When data blocks are written to the cache, metadata for each data block is also written to the cache. This metadata includes a block counter based on a value of the cache counter. After a number of data operations are performed in the cache, the value of the cache counter is updated. Then, each data block is selectively updated based on a comparison of the value of the cache counter with a value of the block counter in the metadata for the corresponding data block.

21 Claims, 7 Drawing Sheets

SYSTEM AND METHOD FOR SYNCHRONIZING CACHES AFTER REBOOT

RELATED APPLICATION

This application is a continuation of U.S. patent application Ser. No. 14/599,353, filed on Jan. 16, 2015, which is hereby incorporated by reference in its entirety.

TECHNICAL FIELD

Examples described herein relate to caching, and more specifically, to a system and method for synchronizing caches after reboot.

BACKGROUND

Data storage technology over the years has evolved from a direct attached storage model (DAS) to using remote computer storage models, such as Network Attached Storage (NAS) and Storage Area Network (SAN). With the direct storage model, the storage is directly attached to the workstations and applications servers, but this creates numerous difficulties with administration, backup, compliance, and maintenance of the directly stored data. These difficulties are alleviated at least in part by separating the application server/workstations form the storage medium, for example, using a computer storage network.

A typical NAS system includes a number of networked servers (e.g., nodes) for storing client data and/or other resources. The servers may be accessed by client devices (e.g., personal computing devices, workstations, and/or application servers) via a network such as, for example, the Internet. Specifically, each client device may issue data access requests (e.g., corresponding to read and/or write operations) to one or more of the servers through a network of routers and/or switches. Typically, a client device uses an IP-based network protocol, such as Common Internet File System (CIFS) and/or Network File System (NFS), to read from and/or write to the servers in a NAS system.

Conventional NAS servers include a number of data storage hardware components (e.g., hard disk drives, processors for controlling access to the disk drives, I/O controllers, and high speed cache memory) as well as an operating system and other software that provides data storage and access functions. In addition, they can include persistent storage cache devices that provide faster access to data compared to hard disk drives and persistency through reboots, which is not possible with DRAM cache memory. However, in the event of an unexpected reboot, data blocks in the persistent cache and on the hard disk can end up out-of-sync.

DETAILED DESCRIPTION

Figure 1:
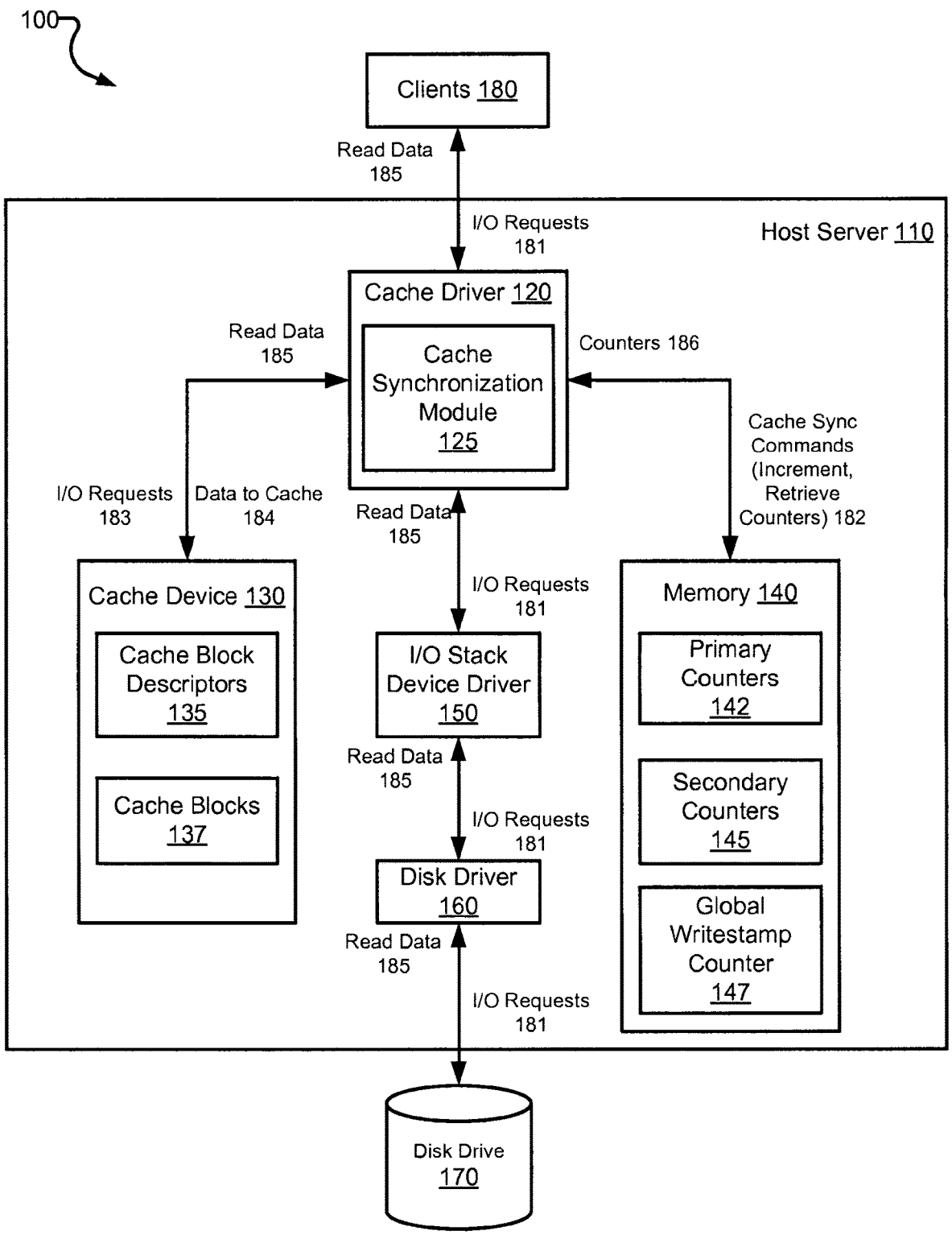
FIG. 1 illustrates an example system for synchronizing caches after reboot, in accordance with some aspects.

Examples described herein include a host server that responds to client data requests using a synchronized cache device and disk drives. More specifically, the host server can write data blocks to the cache device and a disk drive in parallel by including counters in cache metadata that track the status of the data blocks. In this manner, cache consistency can be maintained without having to discard an entire cache when the host server is rebooted after an interruption.

In a cached environment, a host server stores a global cache writestamp counter (i.e., the "cache counter") associated with the cache, which can be stored in the cache itself or in another permanent storage device. When data blocks are written to the cache, metadata for each data block is also written to the cache. This metadata includes a block writestamp counter (i.e., the "block counter") based on a value of the cache counter. After a number of data operations are performed in the cache, the value of the cache counter is updated. Then, each data block is selectively updated based on a comparison of the value of the cache counter with a value of the block counter in the metadata for the corresponding data block.

According to some embodiments, metadata is stored in a cache which is associated with (i) a data block that is stored in the cache, and (ii) a location on a disk device of the cache. When the computing device is started, each data block in the cache is selectively updated, based on the metadata, with data stored at the location on the disk device. In some variations, the cache can be stored as a persistent storage device.

In some aspects, each data block in the cache is selectively updated when the host server boots, and each data block is updated by retrieving data from a disk device identified in the metadata for the corresponding data block. In other aspects, each data block can be updated by discarding the data in the data block.

In further aspects, the value of the stored cache counter is updated after a number of data operations completed reaches or exceeds a threshold value, and the data operations are cache write operations. In addition, the value of the block counter written into the metadata can be different than the value of the cache counter stored in the cache at the time the block counter is written.

Through the use of storing a global cache counter and individual block counters in cache metadata, data between the cache device and disk drives are kept in sync even during write interruptions. Moreover, the number of metadata updates for each I/O is minimized, and writing of data and metadata, both to cache and disk, can be done in parallel, which allows I/O operations to complete with lower latency versus a serialized approach. This also allows a server to restart with its cache data intact, as opposed to starting with a fresh cache, while maximizing performance during normal operations.

The term "cache" and variants thereof refer to a component that transparently stores data so that future requests for that data can be served faster. The data that is stored within a cache might be values that have been computed earlier or duplicates of original values that are stored elsewhere. If requested data is contained in the cache (cache hit), this request can be served by simply reading the cache, which is comparatively faster. Otherwise (cache miss), the data has to be recomputed or fetched from its original storage location, such as a disk drive, which is comparatively slower. Hence, the greater the number of requests that can be served from the cache, the faster the overall system performance becomes.

One or more aspects described herein provide that methods, techniques and actions performed by a computing device are performed programmatically, or as a computer-implemented method. Programmatically means through the use of code, or computer-executable instructions. A programmatically performed step may or may not be automatic.

One or more aspects described herein may be implemented using programmatic modules or components. A programmatic module or component may include a program, a subroutine, a portion of a program, a software component, or a hardware component capable of performing one or more stated tasks or functions. In addition, a module or component can exist on a hardware component independently of other modules or components. Alternatively, a module or component can be a shared element or process of other modules, programs or machines.

Furthermore, one or more aspects described herein may be implemented through the use of instructions that are executable by one or more processors. These instructions may be carried on a computer-readable medium. Machines shown or described with figures below provide examples of processing resources and computer-readable media on which instructions for implementing some aspects can be carried and/or executed. In particular, the numerous machines shown in some examples include processor(s) and various forms of memory for holding data and instructions. Examples of computer-readable media include permanent memory storage devices, such as hard drives on personal computers or servers. Other examples of computer storage media include portable storage units, such as CD or DVD units, flash or solid state memory (such as carried on many cell phones and consumer electronic devices) and magnetic memory. Computers, terminals, network enabled devices (e.g., mobile devices such as cell phones) are all examples of machines and devices that utilize processors, memory, and instructions stored on computer-readable media.

Alternatively, one or more examples described herein may be implemented through the use of dedicated hardware logic circuits that are comprised of an interconnection of logic gates. Such circuits are typically designed using a hardware description language (HDL), such as Verilog and VHDL. These languages contain instructions that ultimately define the layout of the circuit. However, once the circuit is fabricated, there are no instructions. All the processing is performed by interconnected gates.

System Overview

FIG. 1 illustrates an example system for synchronizing caches after reboot, in accordance with some aspects. The system 100 includes a host server 110 with one or more disk drives 170 and accessed by clients 180. As described in more detail below, a system 100 of FIG. 1 stores metadata in a cache resource, where the metadata is associated with each of (i) a data block of the cache resource, and (ii) a location on a disk device of the cache resource. When a computing device of the cache resource is started, each data block in the cache resource is selectively updated, based on the metadata, with data stored at the location on the disk device.

In more detail, host server 110 includes a cache driver 120, cache device 130, memory 140, I/O stack device driver 150, and a disk driver 160. Although shown with these specific components, host server 110 can contain others that have been omitted for simplicity. In addition, the components shown can be rearranged into other configurations and still synchronize caches after reboot.

Cache driver 120 receives I/O requests 181 from clients 180. These clients 180 can be applications running on user devices, services running on other servers, or any device capable of requesting data to be read or written. I/O requests 181 include data read requests, which ask for a specific block or blocks of data to be read from disk drive 170, and data write requests, which ask for blocks of data to be written into the disk drive 170. Although depicted with a single disk drive 170, disk drive 170 represents any number of permanent storage media, such as hard disk drives, solid state drives, flash memory devices, etc. Disk drive 170 can be directly attached to host server 110 or part of a storage area network (SAN) or separate network attached storage (NAS) server.

When the cache driver 120 receives a read I/O request 181, the cache driver 120 can check if cache device 130 contains the requested data first. This can provide a performance boost for host server 110 when the cache device 130 has a lower latency to access and read than the disk drive 170. If the cache driver 120 finds a matching cache block 137 in the metadata stored in the cache block descriptors 135, the read data 185 can be returned from the cache blocks 137 and forwarded back to the requesting client 180. If the data is not found in the cache device 130, the I/O request 181 is passed through an I/O stack device driver 150 and, if reading from disk drive 170, disk driver 160.

In some examples, cache device 130 is a persistent storage medium, such as a flash memory device, which retains its data even after a loss of power. This allows data stored in the cache device 130 to remain available to clients 180 after a reboot. However, in the event of an unexpected system shutdown and reboot, data in the cache device 130 and on the disk drive 170 can be out of sync. For example, this can occur if data is written to the disk drive 170 in response to a write I/O request 181 and the same data is not yet written to the cache device 130 when the shutdown occurs. In another example, the cache device 130 can be in a "write back" mode where writes are done only to the low latency cache device 130 and then migrated to the disk drive 170 later.

In an aspect, in order to keep the data in cache device 130 and disk drive 170 synchronized, cache driver 120 includes a cache synchronization module 125 that keeps track of and writes counters into the cache device 130 and memory 140 in response to write I/O requests 181. Cache device 130 includes cache blocks 137, which store the data to cache 184 which is mirrored on the disk drive 170. Cache block descriptors 135 contain metadata identifying the cache blocks 137 as well as a block writestamp counter (i.e., the block counter) used for synchronization after a reboot.

Memory 140 can be any type of computer memory, such as dynamic random access memory (DRAM). Memory 140 is a low latency component, but all data stored in it is unrecoverable on a power failure or reboot. Memory 140 contains primary counters 142, secondary counters 145, and a global cache writestamp counter 147 (i.e., the cache counter), among other data used in the normal operation of host server 110. In some aspects, the primary counters 142 and secondary counters 145, explained in more detail in FIG. 2B, are used to count the number of I/O requests 181 received by the cache driver 120. Cache synchronization module 125 can issue cache sync commands 182 to the memory 140 to increment or retrieve any of the counters. For example, the cache synchronization module can retrieve the global cache writestamp counter 147 and write it into a cache block descriptor 135 as a block writestamp counter for a new or updated cache block 137. In addition, when the primary counters 142 reach a threshold of write I/O requests 181, the cache synchronization module can write the global cache writestamp counter into a special area of the cache device 130. On synchronization after a reboot, this global cache writestamp counter in the cache device 130 can be compared with the individual block writestamp counters in each cache block descriptor 135 in order to determine whether to update the corresponding cache block 137. This process is explained in more detail with respect to FIGS. 3-5.

Figure 2A:
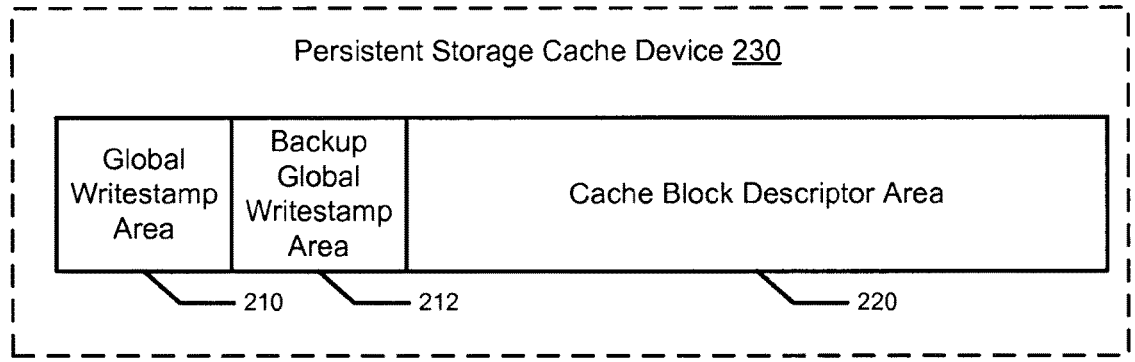
FIG. 2A illustrates an example data structure stored in a cache for synchronizing caches after reboot, in accordance with some aspects.
Figure 2B:
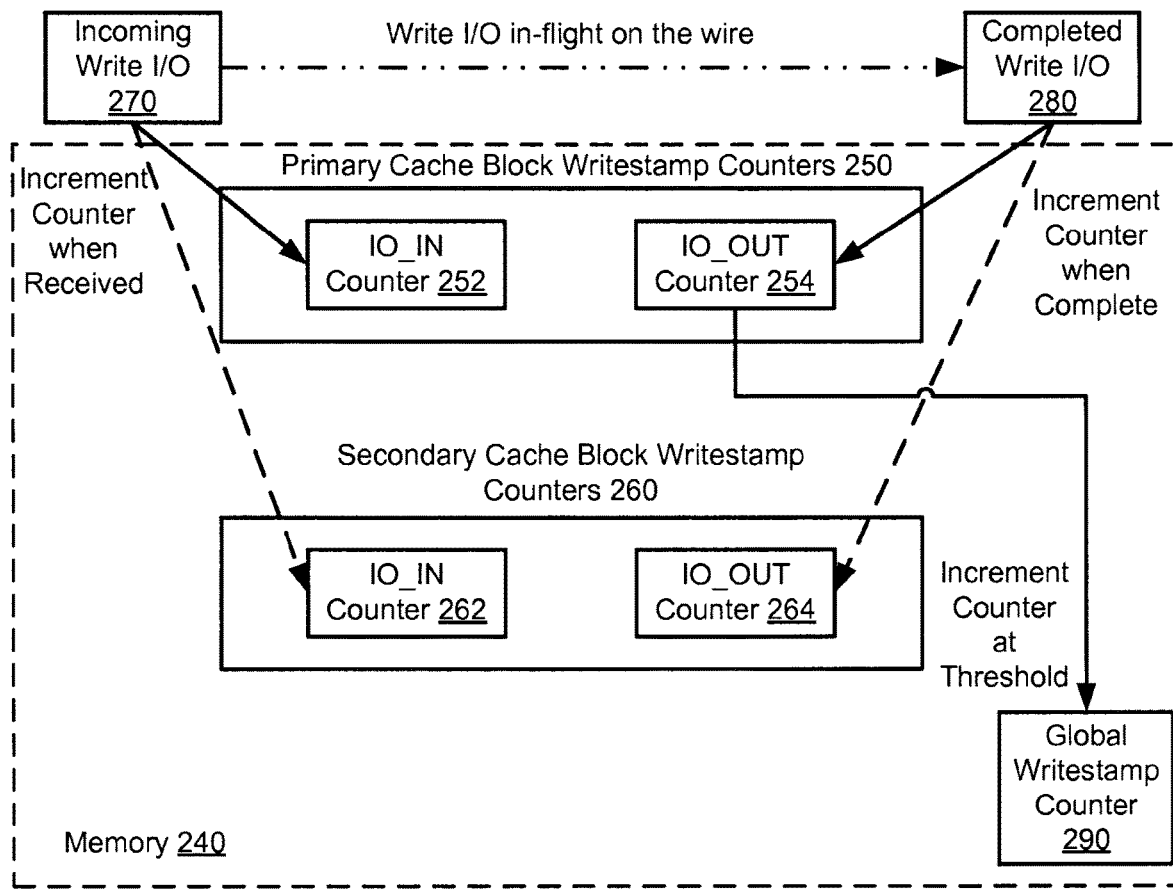
FIG. 2B illustrates example data structures stored in memory for synchronizing caches after reboot, in accordance with some aspects.

FIG. 2A illustrates an example data structure stored in a cache for synchronizing caches after reboot, in accordance with some aspects. The persistent storage cache device 230 may be, for example, cache device 130 depicted as part of host server 110 in FIG. 1.

Besides containing cached data blocks (not shown), the persistent storage cache device 230 contains data structures, cache block descriptors, to describe each of the data blocks in the cache. These data structures can be stored in the cache block descriptor area 220. Cache block descriptors contain metadata such as which disk drive the cache block belongs to, the logical block address (LBA) on the disk drive corresponding to the cache block, and whether the cache block is valid, dirty, or discarded, among other metadata. In addition, each cache block descriptor includes a block writestamp counter with a value that matches the global cache writestamp counter at the time the cache block is written or updated. Although depicted here as stored in the persistent storage cache device 230, cache block descriptors can also be stored in memory for faster lookups during normal operation.

Each cache block descriptor is created when a cache block is written for the first time, either during a cache fill due to a read operation or during a write operation. Each time a cache block is invalidated or has data written to it, the corresponding cache block is updated in both memory and in the cache.

In addition to the cache block descriptor area 220, the cache has two areas reserved for storing a value for the global cache writestamp counter, global writestamp area 210 and backup global writestamp area 212. In some aspects, unlike the cache block descriptors and included block writestamp counters, of which there is one for every cache block in the cache, there is only one global writestamp (and its backup) for the entire cache. This value can be updated each time the counters stored in memory reach a threshold, described in more detail in FIG. 2B.

In some aspects, when the cache is checked for consistency after a power failure, crash, unexpected reboot, or other event, the value in the global writestamp area 210 is compared to the values of the block writestamp counters in the cache block descriptors. In the event of a failure or other corruption while writing into the global writestamp area 210, the value in the backup global writestamp area 212 can be used instead.

FIG. 2B illustrates example data structures stored in memory 240 for synchronizing caches after reboot, in accordance with some aspects. Memory 240 may be, for example, memory 140 depicted as part of host server 110 in FIG. 1. The memory 240 stores data structures used to maintain cache counters that can be written into the cache, such as the primary cache block writestamp counters 250, secondary cache block writestamp counters 260, and the global cache writestamp counter 290.

At server startup, the global cache writestamp counter 290 is read from the global writestamp area 210 in the persistent storage cache device 230. If this area has not been initialized, the global cache writestamp counter is initialized to a value of 1. In some aspects, the primary and secondary counters in memory are each initialized to a value of 0. When the cache driver on the host server receives a write I/O request 270, the cache synchronization module increments the IO_IN counter 252 in the primary cache block writestamp counters 250. The IO_IN counter 252 is one higher than the IO_OUT counter 254 while the write I/O is in flight on the wire. However, once the write request is written to both the cache and disk, it is considered a completed write I/O 280, and the IO_OUT counter 254 is incremented. If there were no more write I/O commands in the interim, the value of IO_IN counter 252 matches IO_OUT counter 254, otherwise IO_IN counter 252 may be larger than IO_OUT counter 254 until the next write I/O commands complete.

Figure 3:
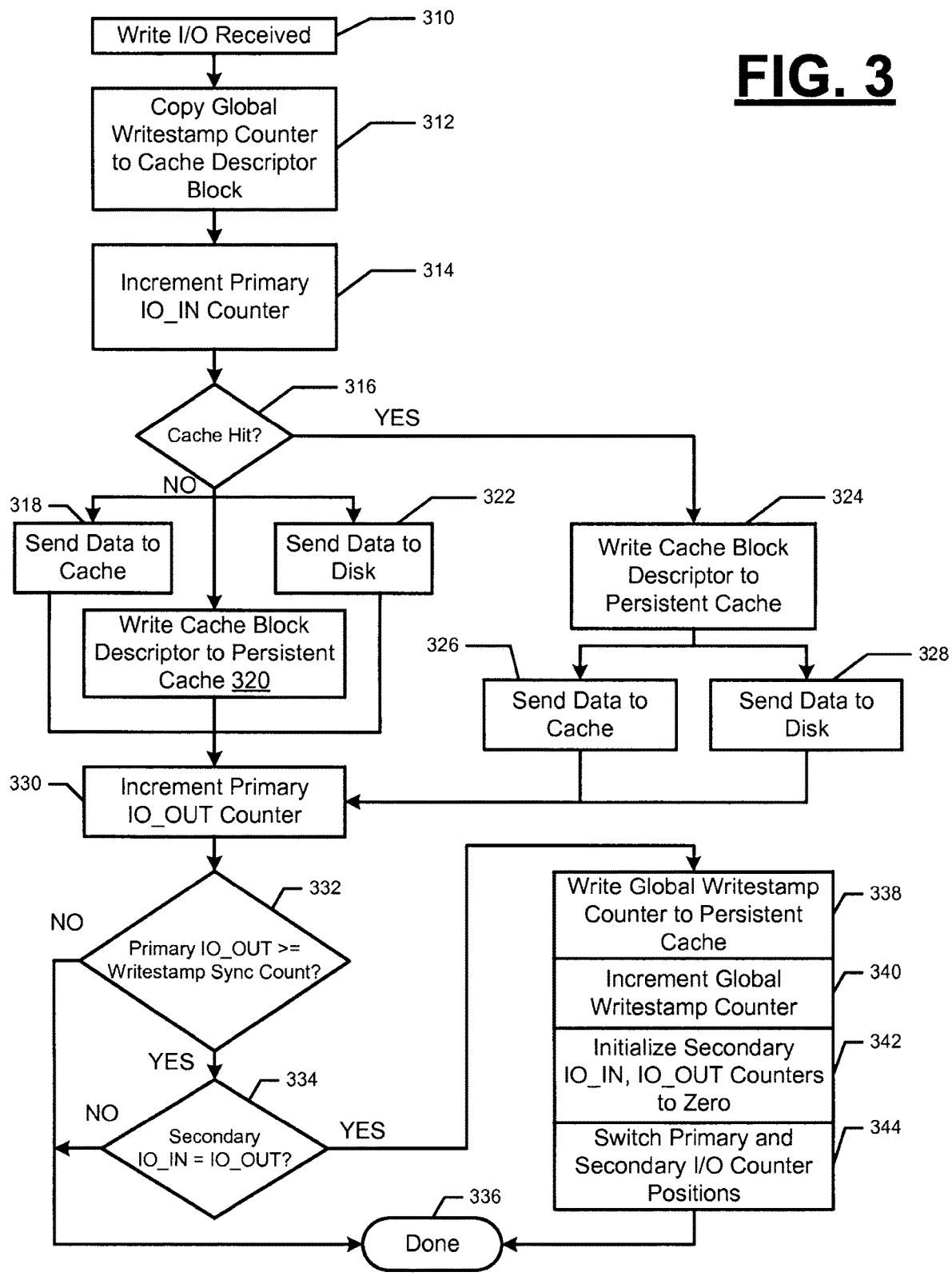
FIG. 3 illustrates a method for operating a cache that enables synchronization after reboot, in accordance with some aspects.

Once the primary IO_OUT counter 254 reaches a threshold value, such as 100 completed write I/O operations 280, the cache synchronization module increments the global cache writestamp counter 290 in the memory 240 (described in more detail with respect to FIG. 3). In addition, the primary cache block writestamp counters 250 and secondary cache block writestamp counters 260 are swapped so that the secondary IO_IN counter 262 and secondary IO_OUT counter 264 become the primaries, and vice versa. After the swap, incoming write I/O operations 270 trigger the cache synchronization module to increment the IO_IN counter 262, and completed write I/O operations 280 increment the IO_OUT counter 264. Memory 240 contains two sets of these counters so that the primary IO_IN counter 252 and primary IO_OUT counter 254 can be reset to zero when swapped to secondary status without potentially resetting during an incoming write I/O 270.

Methodology

FIG. 3 illustrates a method for operating a cache that enables synchronization after reboot, in accordance with some aspects. While operations of the method are described below as being performed by specific components, modules or systems of the computer system 100, it will be appreciated that these operations need not necessarily be performed by the specific components identified, and could be performed by a variety of components and modules, potentially distributed over a number of machines. Accordingly, references may be made to elements of system 100 for the purpose of illustrating suitable components or elements for performing a step or sub step being described. Alternatively, at least certain ones of the variety of components and modules described in system 100 can be arranged within a single hardware, software, or firmware component. It will also be appreciated that some of the steps of this method may be performed in parallel or in a different order than illustrated.

With reference to an example of FIG. 3, a write I/O request is received at, for example, a cache driver 120 of a host server 110 as described with FIG. 1 (310). The value of the global cache writestamp counter currently stored in memory is copied into a new cache descriptor block associated with the block of data to be written from the I/O request (312). In addition, further metadata can be included in the cache descriptor block as described above with respect to FIG. 2. The cache synchronization module increments the primary cache block writestamp IO_IN counter to represent the received write request and indicate that there is a write in progress, or "in-flight."

Using the metadata received with the data to be written, the host server's cache driver can check the cache block descriptors to determine whether the write request replaces data that is already in the cache (i.e., a cache hit) (316). Although cache block descriptors are stored in the cache itself, they can also reside in memory for performance gains since DRAM has shorter access times compared to a persistent storage cache device. The cache block descriptors also contain metadata that can be compared to the metadata in the write request to determine whether there is a cache hit or not. If it is determined that the data block identified in the write request is not in the cache, the cache driver can perform multiple steps in parallel.

In some aspects, the cache driver sends the data to the cache to be stored for faster retrieval by later read requests (318). In addition, the cache driver forwards the data to an I/O stack device driver to be written to other permanent storage, such as a disk drive (322). The cache driver also writes a new cache block descriptor to the persistent cache, which can also be stored in memory for faster lookups (320). This cache block descriptor includes the current global cache writestamp counter from memory, which is used in a comparison with the value of the global cache writestamp counter to determine whether the data identified in the cache block descriptor should be updated on reboot.

On the other hand, if the write request is determined to not be a cache hit, the cache driver writes the new cache block descriptor to the persistent cache (324) then sends the data to the cache (326) and disk (328) to be written. This cache block descriptor also includes the current global cache writestamp counter from memory.

In either situation, the cache synchronization module increments the primary IO_OUT counter after the data has been successfully written to the cache and disk (330). This IO_OUT counter matches the IO_IN counter that was incremented before the data was sent to be written, and incrementing it represents that the write operation is no longer on the wire.

After incrementing the primary IO_OUT counter, the cache synchronization module checks if the primary IO_OUT counter has reached or exceeded the writestamp sync count threshold (332). In some aspects, the threshold can be a number of I/O operations to count up to before increasing the global cache writestamp counter. For example, if the threshold is set to 100, the cache synchronization module increments the global cache writestamp counter by one for each 100 write operations that are written to the cache and disk. The value of the threshold is a performance tradeoff: if it is set too low, the host server may waste resources constantly incrementing and re-initializing counters; however, the value of the threshold puts a cap on the number of cache blocks that may have to be updated upon host reboot. Therefore, if the threshold is set too high, the host may have to update a large number of cache blocks on reboot.

In other aspects, the threshold can be implemented in a manner other than a count of completed write requests. For example, read requests or other data inputs can be included in the counter, or a timer can be used to determine when to update the global cache writestamp counter in place of counting I/O.

When the cache synchronization module determines that the threshold has been reached, it further checks if the secondary IO_IN counter is equivalent to the second IO_OUT counter (334). If either the threshold has not be reached or the secondary counters are not equal, the cache synchronization module takes no further action and waits for the next write I/O (336). Otherwise, the cache synchronization module performs a sequence of operations on the counters.

First, the value of the global cache writestamp counter in memory is written to the global writestamp area and backup area in the cache, which overwrites the previous values stored there (338). In some aspects, the value of the global cache writestamp counter in memory is one higher than the value in the cache before it is overwritten. However, once it is written, the value of the global cache writestamp counter in memory can be incremented to once again be one higher than the value written in the cache (340). The cache synchronization module can also initialize the secondary IO_IN and IO_OUT counters to zero (342) and swap their places so that the primary counters become the secondary counters and vice versa (344). Once these operations are complete, the cache synchronization module waits for the next write I/O (336).

EXAMPLE

Figure 4:
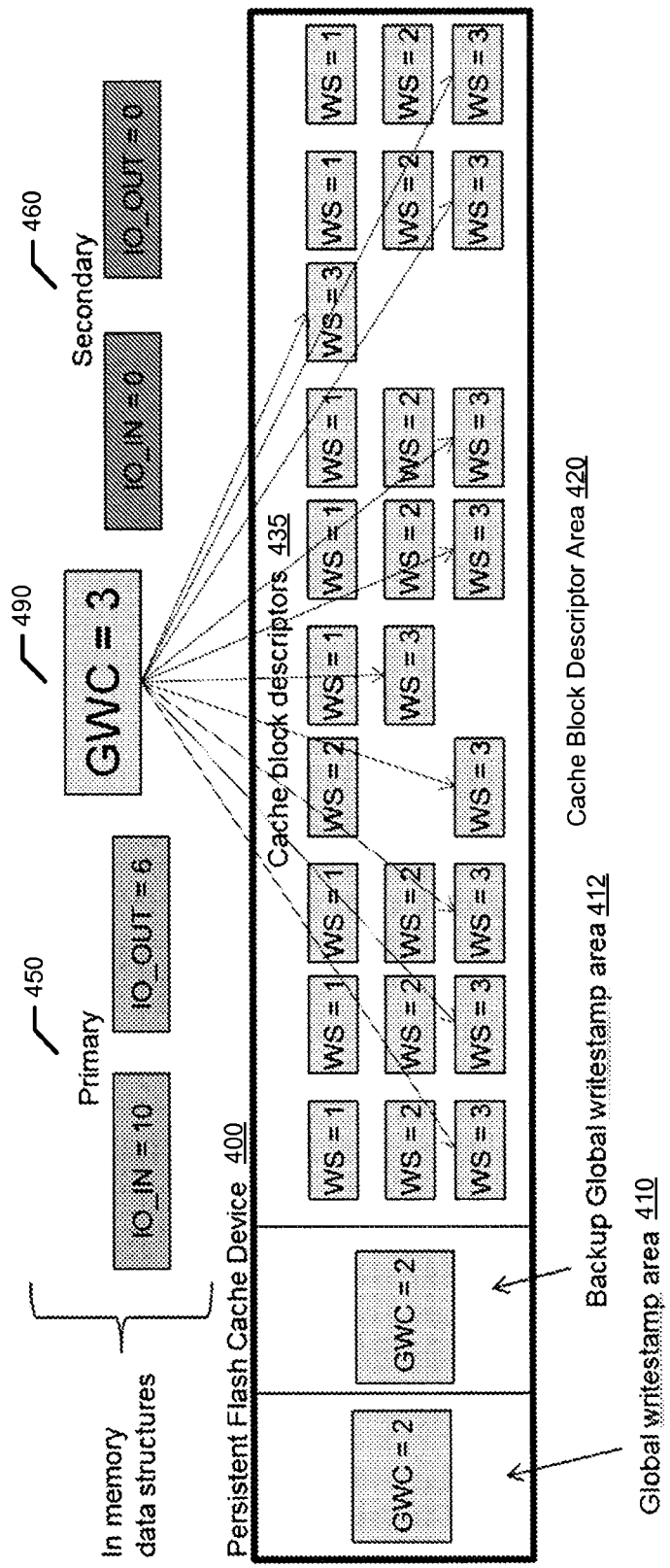
FIG. 4 illustrates example data structures in operation to enable synchronization after reboot, in accordance with some aspects.

FIG. 4 illustrates example data structures in operation to enable synchronization after reboot, in accordance with some aspects. In this example, a number of cache block descriptors 435 are currently stored in the cache block descriptor area 420 of a persistent flash cache device 400 on a host, such as host server 110 as described with FIG. 1. Each of the cache block descriptors 435 contains metadata referencing one of the data blocks stored in the cache. In this example, the writestamp counter (WS) written by the cache synchronization module is illustrated.

In some aspects, when the host server starts up, the cache synchronization module initializes the primary IO_IN and IO_OUT counters 450 and the secondary IO_IN and IO_OUT counters 460 in memory to zero. The global cache writestamp counter (GWC) 490, on the other hand, is read from the persistent flash cache device 400 if available and then stored in memory. In the example of FIG. 4, the host server started with an empty cache, and therefore GWC 490 was initialized to 1 and the value in the global writestamp area 410 and backup global writestamp area 412 initialized to 0. In addition, the writestamp sync threshold is set to 10 for this example, which means that the GWC 490 is incremented after every 10 write requests are successfully written to cache and disk.

As depicted in the cache block descriptor area 420, there are 26 individual cache block descriptors 435 in the cache with writestamp values of 1, 2, and 3. The cache block descriptors 435 with WS=1 represent the first ten that were written to cache, however two of them have since been overwritten by subsequent write requests. The cache block descriptors 435 with WS=2 represent the second ten that were written to cache, but two of those have also been overwritten. The cache block descriptors 435 with WS=3 match the current GWC 490 and are the most recently written. The global writestamp area 410 and backup global writestamp area 412 contain the value of 2, however, because the primary IO_OUT counter has not yet reached the writestamp sync threshold of 10 which would trigger those values to be overwritten with the GWC 490.

In this example, the primary counters 450 are currently 10 for IO_IN and 6 for IO_OUT. Therefore, ten data writes have been received at the cache driver, but only six have successfully been written to disk. As a result, there are ten cache block descriptors 435 with WS=3, but the GWC has not been updated in memory or written to the appropriate areas in the cache.

In the event of an unexpected reboot of the host server at this point, all cache block descriptors 435 with the value of 3 are deemed dirty and should be updated because their WS values are greater than the value stored in the writestamp areas 410, 412. This process is discussed further with respect to FIG. 5.

Figure 5:
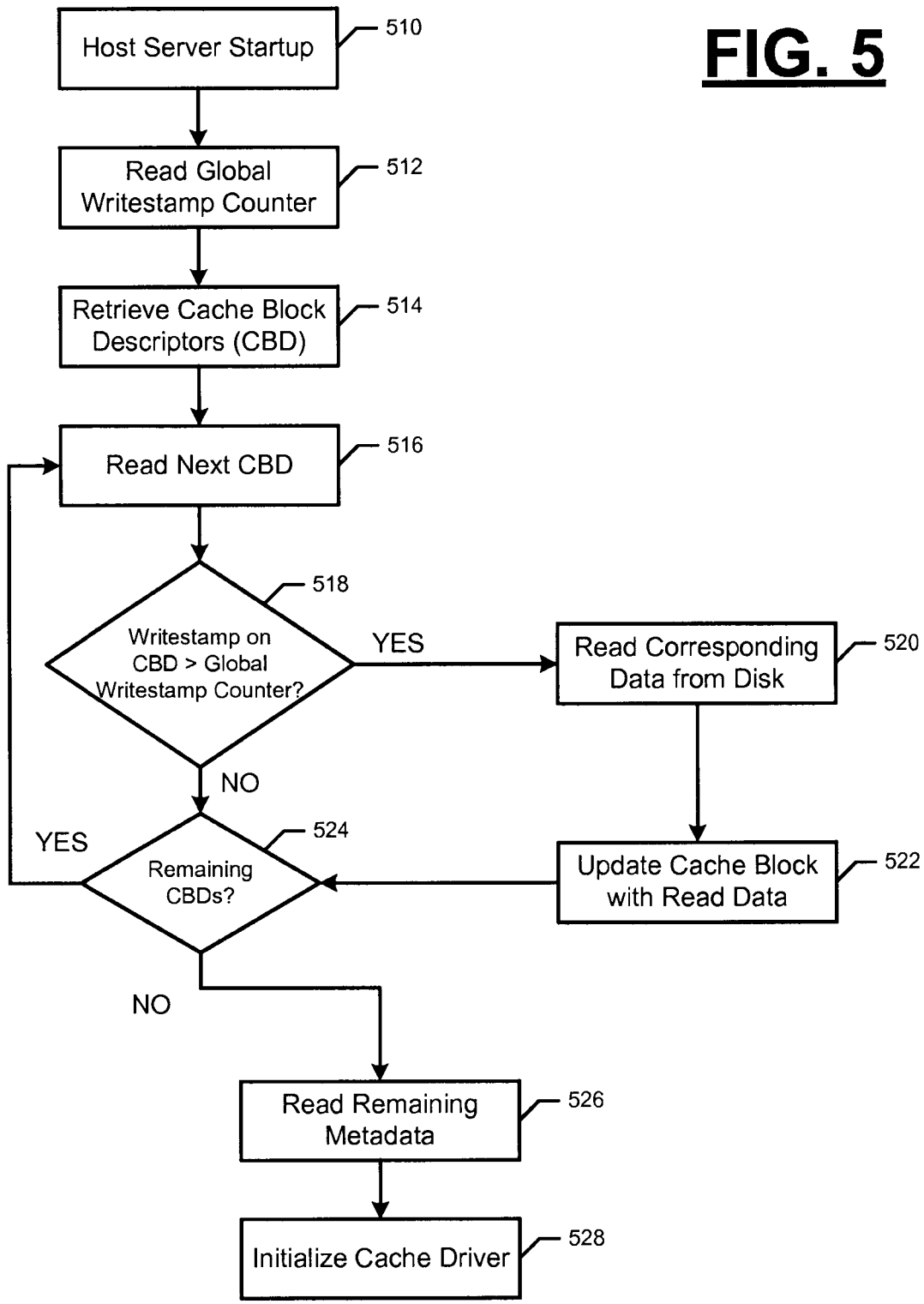
FIG. 5 illustrates a method for selectively updating cache blocks, in accordance with some aspects.

FIG. 5 illustrates a method for selectively updating cache blocks, in accordance with some aspects. While operations of the method are described below as being performed by specific components, modules or systems of the computer system 100, it will be appreciated that these operations need not necessarily be performed by the specific components identified, and could be performed by a variety of components and modules, potentially distributed over a number of machines. Accordingly, references may be made to elements of system 100 for the purpose of illustrating suitable components or elements for performing a step or sub step being described. Alternatively, at least certain ones of the variety of components and modules described in system 100 can be arranged within a single hardware, software, or firmware component. It will also be appreciated that some of the steps of this method may be performed in parallel or in a different order than illustrated.

With reference to an example of FIG. 5, a host server starts, or boots, after an unexpected shutdown due to power failure, hardware or software errors, or other causes (510). As part of the startup routine, the cache synchronization module reads the value of the global cache writestamp counter written in the persistent storage cache device (512). In addition, the cache synchronization module retrieves all the cache block descriptors from the cache (514).

For each of the cache block descriptors, the cache synchronization module reads its writestamp value (516) and compares it to the value of the global cache writestamp counter read from the cache (518). If the value of the cache block descriptor writestamp is greater than the global cache writestamp counter, this can mean that the corresponding data block in the cache is not the same as what is written on the disk drive. For example, the host server may have rebooted after the data was written to one place but not the other since the writes happen in parallel for performance gains. In this case, metadata is read from the cache block descriptor and sent to the I/O stack to retrieve the corresponding data from disk (520). The cache synchronization module can then overwrite the out-of-sync data that was in the cache with the data from disk (522). In other aspects, the cache synchronization module can discard the out-of-sync data in the cache instead of replacing it.

If there are any remaining cache block descriptors, the cache synchronization module continues reading and comparing their writestamp values to the global cache writestamp counter value (524). Otherwise, the other remaining metadata information is read from the cache (526) and the cache driver is initialized for operation (528).

Figure 6:
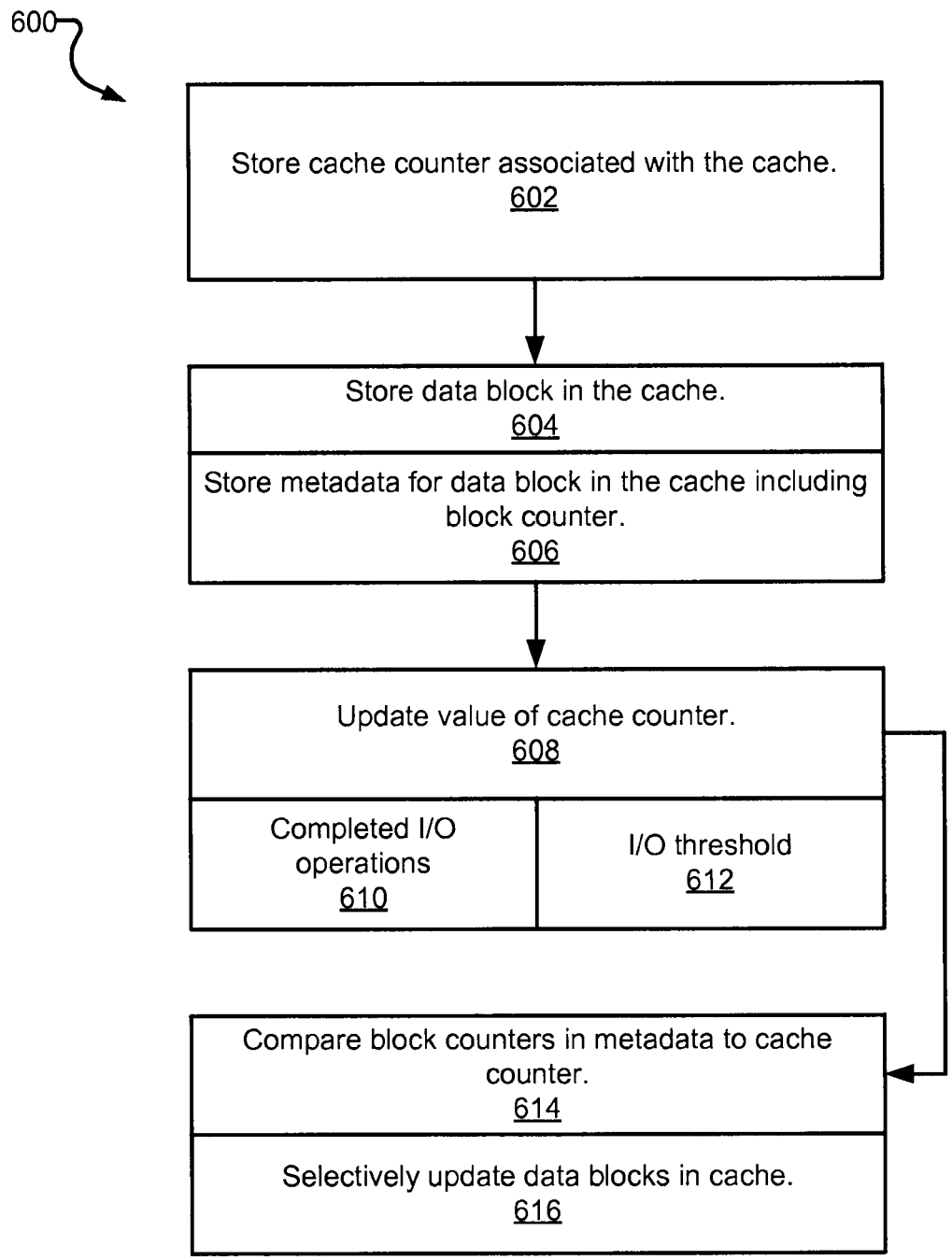
FIG. 6 illustrates a method for synchronizing a cache after reboot, in accordance with some aspects.

FIG. 6 illustrates a method for synchronizing a cache after reboot, in accordance with some aspects.

A cache synchronization module running on a host server stores a cache counter associated with the cache (602). In some aspects, this counter is stored in the cache itself, but it can also be stored elsewhere, such as on a hard disk. In response to receiving write I/O requests, a cache driver stores data blocks in the server cache (604). In addition, the cache driver stores metadata for each of the data blocks in the cache (606). This metadata includes a block counter based on the value of the cache counter.

The cache synchronization module can update the value of the cache counter (608). In some aspects, this can be done as a result of a number of completed write I/O requests (610) reaching or exceeding a threshold value (612).

When the data in the cache and on the hard disk are to be synchronized, for example after a power failure or unexpected reboot, the cache synchronization module compares block counters in the metadata for each cache block descriptor to the cache counter read from the cache (614). Based on the comparison, data blocks in the cache are selectively updated, for example with data read from the hard disk (616).

Computer System

Figure 7:
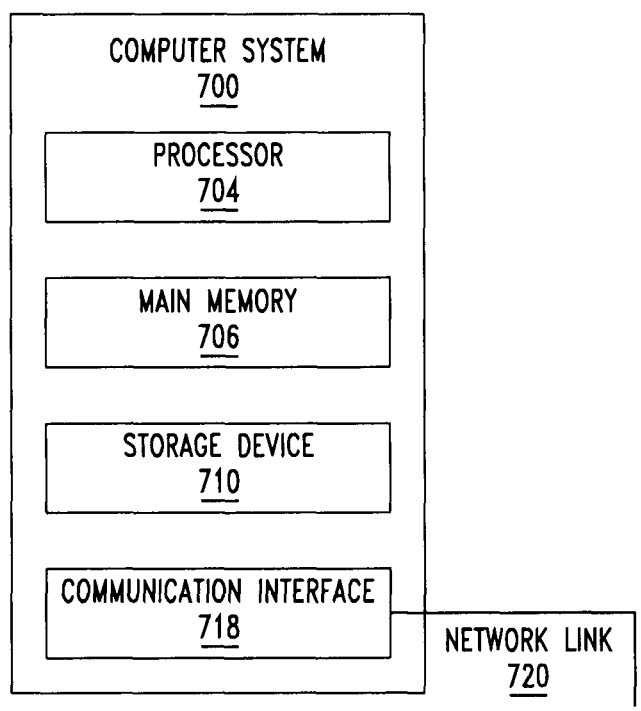
FIG. 7 is a block diagram that illustrates a computer system upon which aspects described herein may be implemented.

FIG. 7 is a block diagram that illustrates a computer system upon which aspects described herein may be implemented. For example, in the context of FIG. 1, system 100 may be implemented using one or more servers such as described by FIG. 7.

In an embodiment, computer system 700 includes processor 704, memory 706 (including non-transitory memory), storage device 710, and communication interface 718. Computer system 700 includes at least one processor 704 for processing information. Computer system 700 also includes the main memory 706, such as a random access memory (RAM) or other dynamic storage device, for storing information and instructions to be executed by processor 704. Main memory 706 also may be used for storing temporary variables or other intermediate information during execution of instructions to be executed by processor 704. Computer system 700 may also include a read only memory (ROM) or other static storage device for storing static information and instructions for processor 704. The storage device 710, such as a magnetic disk or optical disk, is provided for storing information and instructions. The communication interface 718 may enable the computer system 700 to communicate with one or more networks through use of the network link 720 and any one of a number of well-known transfer protocols (e.g., Hypertext Transfer Protocol (HTTP)). Examples of networks include a local area network (LAN), a wide area network (WAN), the Internet, mobile telephone networks, Plain Old Telephone Service (POTS) networks, and wireless data networks (e.g., WiFi and WiMax networks).

Examples described herein are related to the use of computer system 700 for implementing the techniques described herein. According to one embodiment, those techniques are performed by computer system 700 in response to processor 704 executing one or more sequences of one or more instructions contained in main memory 706. Such instructions may be read into main memory 706 from another machine-readable medium, such as storage device 710. Execution of the sequences of instructions contained in main memory 706 causes processor 704 to perform the process steps described herein. In alternative aspects, hard-wired circuitry may be used in place of or in combination with software instructions to implement aspects described herein. Thus, aspects described are not limited to any specific combination of hardware circuitry and software.

Although illustrative aspects have been described in detail herein with reference to the accompanying drawings, variations to specific examples and details are encompassed by this disclosure. It is intended that the scope of examples described herein be defined by claims and their equivalents. Furthermore, it is contemplated that a particular feature described, either individually or as part of an embodiment, can be combined with other individually described features, or parts of other aspects. Thus, absence of describing combinations should not preclude the inventor(s) from claiming rights to such combinations.

What is claimed is:

1. A non-transitory machine-readable medium having stored thereon instructions for performing a method comprising machine executable code which when executed by at least one machine, causes the machine to:
    store metadata in a cache of a computing device, the metadata associated with a data block in the cache and a location of data on a disk device, wherein the metadata includes a block counter that is initiated using a value of a cache counter associated with the cache, and the block counter is incremented each time the data block is accessed;
    increment the cache counter after a number of operations performed in the cache exceeds a threshold; and
    selectively update at startup, based on the value of the block counter and the value of the cache counter, the data block in the cache with the data stored at the location on the disk device.

2. The non-transitory machine-readable medium of claim 1, wherein operations in the number of operations are write operations.

3. The non-transitory machine-readable medium of claim 1, wherein to selectively update the data block in the cache, the machine executable code further causes the at least one machine to:
    update the data block in the cache with the data stored at the location on the disk device when the value of the block counter corresponding to the data block is greater than the value of the cache counter associated with the cache.

4. The non-transitory machine-readable medium of claim 1, wherein to update the data block, the machine executable code further causes the at least one machine to:
    determine that data in the data block is synchronized with the disk device when the value of the block counter corresponding to the data block is equal to the value of the cache counter associated with the cache.

5. The non-transitory machine-readable medium of claim 1, wherein the cache counter is stored in a persistent storage.

6. The non-transitory machine-readable medium of claim 1, wherein the cache counter is stored in the cache.

7. The non-transitory machine-readable medium of claim 1, wherein the value of the block counter stored in the metadata is different from the value of the cache counter at the time the block counter is stored.

8. The non-transitory machine-readable medium of claim 1, wherein the disk device comprises an item selected from the list consisting of: a hard disk drive and a solid state drive.

9. The method of claim 1, The non-transitory machine-readable medium of claim 1, wherein operations in the number of operations are read and write operations.

10. A computing device, comprising:
    a memory containing machine-readable medium comprising machine executable code having stored thereon instructions for performing a method of operating a cache; and
    a processor coupled to the memory, the processor configured to execute code to cause the processor to:
        store metadata in the cache of the computing device, wherein the metadata includes a block counter corresponding to a data block and a location of data on a disk device, and wherein a value of the block counter is initiated using a value of a cache counter associated with the cache, and the block counter is incremented each time the data block is accessed;
        increment the cache counter after a number of operations are performed in the cache; and
        selectively update at startup, based on the value of the block counter and the value of the cache counter, the data block in the cache with the data stored at the location on the disk device.

11. The computing device of claim 10, wherein the processor is further configured to execute code to cause the processor to:
    update the data block in the cache with the data stored at the location on the disk device when the value of the block counter corresponding to the data block is greater than the value of the cache counter associated with the cache.

12. The computing device of claim 10, wherein the processor is further configured to execute code to cause the processor to:
    determine that the data in the data block is synchronized with the disk device when the value of the block counter corresponding to the data block is equal to the value of the cache counter associated with the cache.

13. The computing device of claim 10, wherein the processor is further configured to execute code to cause the processor to:
    copy the cache counter into the cache from another memory storage in order for the selective update to compare the value in the cache counter to the value of the block counter stored in the metadata.

14. The computing device of claim 10, wherein the disk device comprises an item selected from the list consisting of: a hard disk drive and a solid state drive.

15. A method comprising:
    accessing metadata that stores a block counter for a data block of a cache and a location on a disk device that stores data associated with the data block, wherein a value of the block counter is initiated using a value of a cache counter, and the block counter is incremented each time the data block is accessed;
    incrementing the cache counter after a number of operations performed in the cache exceeds a threshold; and
    updating the data block in the cache with the data from the location on the disk device based on the value of the block counter and the value of the cache counter.

16. The method of claim 15, wherein the updating occurs when the value of the block counter is greater than the value of the cache counter.

17. The method of claim 15, further comprising:
    determining that the data in the data block is synchronized with the data on the disk device when the value of the block counter corresponding to the data block is equal to the value of the cache counter associated with the cache.

18. The method of claim 15, wherein operations in the number of operations are write operations.

19. The method of claim 15, wherein the cache is a persistent storage.

20. The method of claim 15, further comprising:
    transferring the cache counter to the cache from a memory device separate from the cache upon startup of a computing device.

21. The method of claim 15, wherein the disk device comprises an item selected from the list consisting of: a hard disk drive and a solid state drive.

\* \* \* \* \*